MARTIN C. REMINGTON.
Improvement in Horse Hay Rakes.
No. 119,721.          Patented Oct. 10, 1871.
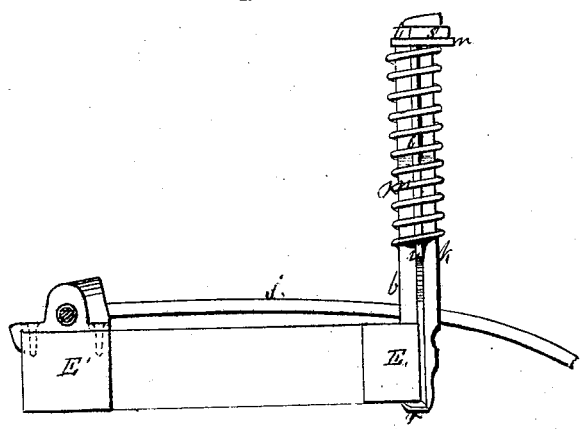
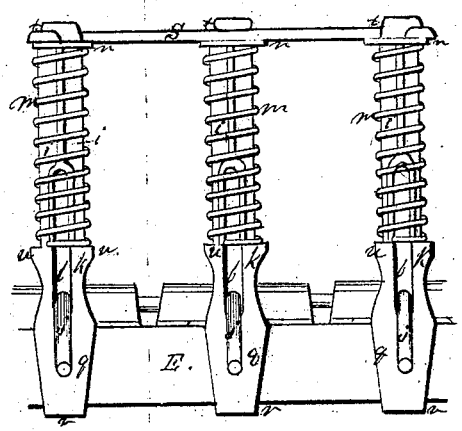

UNITED STATES PATENT OFFICE.

MARTIN C. REMINGTON, OF WEEDSPORT, NEW YORK.

IMPROVEMENT IN HORSE HAY-RAKES.

Specification forming part of Letters Patent No. 119,721, dated October 10, 1871.

*To all whom it may concern:*

Be it known that I, MARTIN C. REMINGTON, of Weedsport, in the county of Cayuga and State of New York, have invented certain new and useful Improvements in Horse Hay-Rakes, as additional improvements on the rake for which I obtained Letters Patent dated September 28, 1869, No. 95,268; and the following is a full, clear, and exact description of the same, reference being had to the accompanying drawing making a part of this specification, in which—

Figure 1 represents an end view of rake-head, with the rake-tooth fastening, and broken-off tooth, and the slotted standard through which the tooth passes, the coiled spring and fastening. Fig. 2 shows a rear view of rake-head, with three of the slotted standards, openings, stop-springs, and top bar for fastening the whole series of springs and bracing the standards.

My invention consists in the method of securing the springs and bracing the series of standard guides together, and the construction of the open standards provided with ribs and stops for the springs, and recesses for the top fastenings.

To enable others to make and use my improvements I will describe them more fully, referring to the drawing and the letters thereon.

The frame E, to which the rake-teeth $j\,j\,j$ are hinged, and the mode of fastening, are the same as those described in my patent dated September 28, 1869, and it is deemed unnecessary to show in the drawing or describe anything other than the parts whereon my improvements are made. The slotted standards $k\,k$ are made of malleable cast-iron, very light, and are provided with ribs $i\,i$ to give them the required strength, the lower portion being fitted with a flat plate, $g$, and right-angle hook $r$, so that they are firmly held in a vertical position to the rear side of the frame E by a single screw. The slot or opening $l$, for the rake-tooth $j$ to pass through, extends from the frame E upward a little more than half of the length of the standard, the portion above it being wings or thin ribs to fill out the four sides to guide the helical spring $m$ that surrounds it. The top of the spring $m$ bears against a washer, $n$, and a key, $s$, made of a flat rod of iron, is inserted in the recess $t$ of the series of standards $k$, which holds all of the springs on and braces them firmly together. About midway of the openings $l$ in the standards are projections $u\,u$ on each side, to stop the lower ends of the springs $m$ from resting on or coming in contact with the rake-teeth $j$, unless they are raised up sufficiently to bear against them; or the rake-head is turned over so as to bring them in contact.

It is by this means that my improved rake works equally well in both heavy and light hay, the rake-head being in such a position that the springs $m\,m$ will bear either upon the teeth $j$ or not, as may be necessary in raking light or heavy hay; or, in other words, the whole pressure of the coil may be thrown upon the tooth or entirely taken off the teeth, leaving them to play along free and independent of each other, so that the rake will run much steadier, accommodating itself to uneven surfaces, and prevents the catching of the teeth in the ground and consequent vibration, which scatters short hay, and is often the means of breaking the teeth.

What I claim as my invention in the improvements in sulky hay-rakes, as above described, is—

The open standard-guides $k\,k$ having ribs $i\,i$, ribs or projections $u\,u$, and recesses $t\,t$ in their tops, in combination with the key $s$ for securing the springs $m$ in their places, and also for coupling and bracing the whole series of guides together, as herein specified.

In testimony whereof I hereunto subscribe my name in the presence of two witnesses.

MARTIN C. REMINGTON.

Witnesses:
  C. J. BEACH,
  ENOS SMITH.